Figure 1:
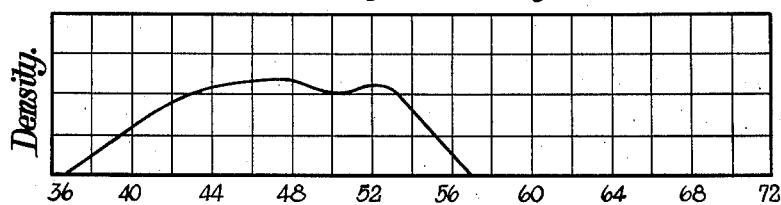

June 12, 1934.   L. G. S. BROOKER   1,962,124
PHOTOGRAPHIC EMULSION CONTAINING 8-SUBSTITUTED OXACARBOCYANINES Filed March 6, 1933

8-Methyl-2,2'-Diethyloxacarbocyanine iodide.

2,2'-Dimethyl-8-Ethyloxacarbocyanine iodide.

Inventor
Leslie G. S. Brooker,

UNITED STATES PATENT OFFICE 1,962,124

PHOTOGRAPHIC EMULSION CONTAINING 8-SUBSTITUTED OXACARBOCYANINES

Leslie G. S. Brooker, Rochester, N. Y., assignor to Eastman Kodak Company, Rochester, N. Y., a corporation of New York Application March 6, 1933, Serial No. 659,632

6 Claims. (Cl. 95—7)

This invention relates to new compositions of matter and particularly to a new class of photographic sensitizing dyes known as 8-substituted oxacarbocyanines, a method of preparing them, and photographic emulsions containing them.

Several classes of dyes containing the benzoxazole nucleus are known. Attempts to prepare an 8-methyl substituted oxacarbocyanine have been made without success (J. C. S. 1928, 3162), but a method of preparing such dyes is described, with examples, in my co-pending application No. 651,870.

This method consists in treating the 1-methyl benzoxazole alkyl quaternary salt with an ortho ester of a monocarboxylic acid, the acid corresponding to which contains more than one carbon atom in the molecule, in the presence of a solvent such as pyridine, and of a strong organic base, such a base being of a type as defined in my aforementioned co-pending application.

The reaction may be expressed graphically as follows—

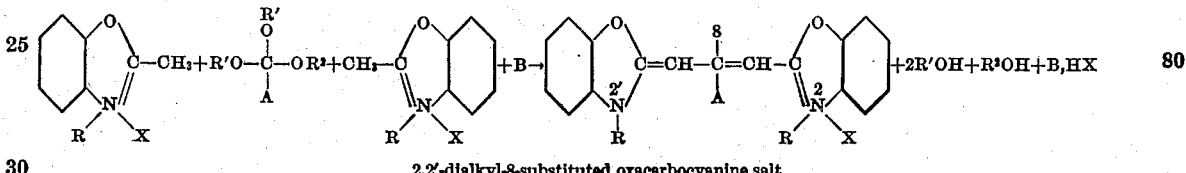

2,2'-dialkyl-8-substituted oxacarbocyanine salt

In the above scheme R, R' and R² are alkyl groups which may be similar or dissimilar, X is an acidic radical, B stands for one molecule of a monoacidic base and A represents the group which it is desired to introduce into the 8-position of the dye, and may be an alkyl group, such as methyl, ethyl, n-propyl or the like.

The numbering of the dye molecule is in accordance with that adopted for the corresponding sulfur-containing dyes, as described, for instance in my U. S. Patent No. 1,846,302. See also my application Serial No. 594,381 describing unsubstituted dibenzoxacarbocyanines.

EXAMPLE 1

*8-methyl-2,2'-diethyloxacarbocyanine iodide*

2.9 parts (2 mols.) of 1-methylbenzoxazole ethiodide are heated with 15 parts of pyridine, 3.25 parts of ethyl ortho-acetate (4 mols., i. e. 300% excess) and 1.1 parts of triethylamine (2.2 mols. i. e. 120% excess) under reflux for three minutes. The dye is precipitated by adding ether to the cooled solution and is purified by washing with acetone followed by water and is recrystallized from methyl alcohol when it is obtained in red prisms with a blue reflex. The solution is yellowish orange.

EXAMPLE 2

*2,2'-dimethyl-8-ethyloxacarbocyanine iodide*

2.7 parts (2 mols.) of 1-methylbenzoxazole is heated with 3.7 parts (2 mols.) of methyl p-toluenesulfonate at 100° C. for some hours to prepare the quaternary salt. This salt is refluxed for seven minutes with 20 parts of pyridine, 7.05 parts (4 mols. i. e. 300% excess) of ethyl ortho-propionate and 2.2 parts (2.2 mols., i. e. 120% excess) of triethylamine. The dye is precipitated by the addition of ether, dissolved in methyl alcohol and precipitated as the iodide by the addition of an aqueous solution of potassium iodide (5 g. in 30 cc. of water). The dye is collected, washed, and recrystallized from methyl alcohol in which it dissolves with an orange color. It is obtained as orange-scarlet aggregates of minute crystals or as much larger ones, some sides of which reflect blue light.

These dyes are useful as photographic sensitizers, since they confer upon photographic emulsions, extra-sensitivity, in general, in the portions of the spectrum indicated in the attached spectrograms.

The diagrammatic spectrograms constituting the accompanying drawing illustrate the regions of the spectrum to which the various types of dyes herein disclosed will sensitize a gelatino-silver-halide emulsion and the extent of the sensitization at various wave lengths. The figures of this drawing and the dyes, the sensitizing properties of which they illustrate, are as follows—

Fig. 1 8-methyl-2,2'-diethyloxacarbocyanine iodide.

Figure 2:
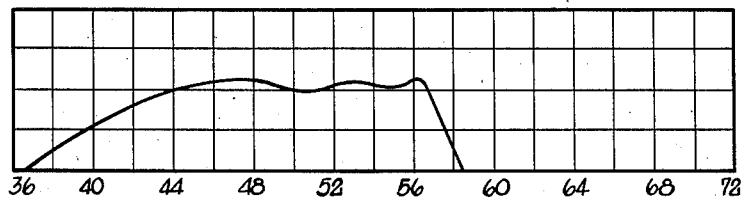

Fig. 2 2,2'-dimethyl-8-ethyloxacarbocyanine iodide.

These figures were taken from bromide emulsions.

The sensitization resulting from the various other dyes herein referred to and belonging to the respective classes of dyes above illustrated are all comparable to the sensitization illustrated as resulting from the specific dyes named in connection with these figures.

The preparation of gelatino-silver-halide emulsions is well known to those skilled in the photographic art. To sensitize such emulsions with the dyes herein described, I first prepare a stock solution of the dye by dissolving it in a suitable alcohol, such as methyl alcohol. Then into one liter of a flowable photographic gelatino-silver-halide emulsion I thoroughly incorporate an amount of the above stock solution (diluted somewhat with water, if desired) containing from approximately .02 to about .005 grams of the desired dye. This sensitized emulsion may then be coated upon a suitable support, such as glass, cellulose derivative, paper or the like, to a suitable thickness and allowed to dry, the details of which are well known to photographic experts. Photographic elements so sensitized have properties different from ones heretofore produced with other sensitizing dyes and hence are of special utility.

The amount of dye which is actually incorporated in a given quantity of emulsion will, of course, vary from dye to dye and emulsion to emulsion and the regulation and adoption of the most economical and useful proportions will be apparent to those skilled in the art upon observing the sensitizing power of the particular dye for the particular emulsion in question. The above proportions are, therefore, to be regarded only as illustrative and not to be understood as limiting the invention in any sense. Furthermore, it will be apparent that these dyes may be incorporated in the emulsion by other methods practiced by the art as, for instance, by bathing the plate or film upon which the emulsion has been coated, in a solution of the dye in an appropriate solvent, although this method of incorporating the dye in the emulsion is not to be preferred over that first described. Obviously, the claims are all intended to cover any combination of these dyes with a photographic emulsion whereby the dye exerts a sensitizing effect upon the emulsion.

Under the class of gelatino-silver-halide emulsions I, of course, include all of the silver halides customarily employed in the art but more particularly the silver chloride and silver bromide emulsions. Under the term photographic emulsions I include, not only the galatino-silver-halide emulsions, but such others as are known to those skilled in the art.

What I claim as my invention and desire to be secured by Letters Patent of the United States is:

1. A gelatino-silver-halide emulsion which contains a 2,2'-dialkyl-8-alkyl-oxacarbocyanine salt.

2. A gelatino-silver-halide emulsion which contains a 2,2'-dialkyl-8-alkyl-oxacarbocyanine halide.

3. A gelatino-silver-halide emulsion which contains a 2,2'-dialkyl-8-methyl-oxacarbocyanine halide.

4. A gelatino-silver-halide emulsion which contains a 2,2'-dialkyl-8-ethyl-oxacarbocyanine halide.

5. A gelatino-silver-halide emulsion which contains a 2,2'-diethyl-8-methyl-oxacarbocyanine iodide.

6. A gelatino-silver-halide emulsion which contains a 2,2'-dimethyl-8-ethyl-oxacarbocyanine iodide.

LESLIE G. S. BROOKER.